(12) United States Patent
Kim (10) Patent No.: US 11,420,544 B2
(45) Date of Patent: Aug. 23, 2022

(54) COOLING FAN AND SEAT COOLING DEVICE COMPRISING SAME

(71) Applicant: AMOTECH CO., LTD., Incheon (KR)

(72) Inventor: Byung Soo Kim, Anyang-si (KR)

(73) Assignee: AMOTECH CO., LTD., Incheon (KR)

( * ) Notice: Subject to any disclaimer, the term of this patent is extended or adjusted under 35 U.S.C. 154(b) by 485 days.

(21) Appl. No.: 16/480,763

(22) PCT Filed: Mar. 15, 2018

(86) PCT No.: PCT/KR2018/003022
§ 371 (c)(1),
(2) Date: Jul. 25, 2019

(87) PCT Pub. No.: WO2018/169316
PCT Pub. Date: Sep. 20, 2018

(65) Prior Publication Data
US 2019/0389345 A1   Dec. 26, 2019

(30) Foreign Application Priority Data

Mar. 17, 2017 (KR) ........................ 10-2017-0034020
Nov. 1, 2017 (KR) ........................ 10-2017-0144650

(51) Int. Cl.
*B60N 2/56* (2006.01)
*F04D 17/16* (2006.01)
(Continued)

(52) U.S. Cl.
CPC ........... *B60N 2/5657* (2013.01); *F04D 17/16* (2013.01); *F04D 29/4213* (2013.01);
(Continued)

(58) Field of Classification Search
CPC .................................................... B60N 2/5657
See application file for complete search history.

(56) References Cited

U.S. PATENT DOCUMENTS 5,925,948 A * 7/1999 Matsumoto ............ H02K 11/33
310/216.115
6,119,463 A * 9/2000 Bell ...................... B60N 2/5657
62/3.61
(Continued)

FOREIGN PATENT DOCUMENTS

JP   05058897   8/1993
JP   2008101537   5/2008
(Continued)

OTHER PUBLICATIONS

International Search Report—PCT/KR2018/003022 dated Jun. 18, 2018.

*Primary Examiner* — Shin H Kim
(74) *Attorney, Agent, or Firm* — Cantor Colburn LLP (57) ABSTRACT

Provided is a cooling fan including: a fan housing having an air inlet formed on a front surface thereof and through which air flows and an air outlet formed at a side surface of the fan housing and through which air is discharged; and an impeller mounted inside the fan housing to introduce air in an axial direction thereof and discharge air in a radial direction thereof, wherein a bypass passage is formed at an edge of the air inlet so that air flowing in a direction opposite to the air outlet can be discharged to the outside. At high power of a cooling fan, backward-flow air is discharged to the outside to minimize noise and improve blowing efficiency.

19 Claims, 9 Drawing Sheets

(51) Int. Cl.
  *F04D 29/42* (2006.01)
  *F04D 29/66* (2006.01)
(52) U.S. Cl.
  CPC ........ *F04D 29/667* (2013.01); *F05B 2240/14* (2013.01); *F05B 2250/501* (2013.01); *F05B 2260/96* (2013.01)

(56) References Cited

U.S. PATENT DOCUMENTS

| | | | |
|---|---|---|---|
| 6,719,534 B2* | 4/2004 | Aoki | B60H 1/00457 |
| | | | 417/44.1 |
| 9,854,915 B2* | 1/2018 | Miron | A47C 7/744 |
| 10,327,556 B2* | 6/2019 | Miron | B60N 2/5635 |
| 10,406,950 B2* | 9/2019 | Yang | B60N 2/5642 |
| 10,967,767 B2* | 4/2021 | Yang | B60N 2/5642 |
| 11,268,527 B2* | 3/2022 | Kim | F04D 19/002 |
| 2002/0150478 A1* | 10/2002 | Aoki | B60N 2/5635 |
| | | | 417/44.1 |
| 2003/0102699 A1* | 6/2003 | Aoki | B60H 1/00285 |
| | | | 297/180.13 |
| 2012/0315132 A1* | 12/2012 | Axakov | B60N 2/5642 |
| | | | 415/182.1 |
| 2013/0164123 A1* | 6/2013 | Helmenstein | F04D 29/4246 |
| | | | 415/182.1 |
| 2017/0196362 A1* | 7/2017 | Miron | A47C 7/748 |
| 2018/0361892 A1* | 12/2018 | Iacovone | B60N 2/70 |
| 2018/0361893 A1* | 12/2018 | Iacovone | B60N 2/5657 |
| 2019/0389345 A1* | 12/2019 | Kim | F04D 25/0613 |
| 2020/0086774 A1* | 3/2020 | Muto | B60H 1/00878 |
| 2020/0271131 A1* | 8/2020 | Kim | F04D 29/703 |

FOREIGN PATENT DOCUMENTS

| | | |
|---|---|---|
| JP | 2015028341 | 2/2015 |
| KR | 200332249 | 11/2003 |
| KR | 20150045901 | 4/2015 |
| WO | 2016132757 | 8/2016 |

\* cited by examiner

COOLING FAN AND SEAT COOLING DEVICE COMPRISING SAME

TECHNICAL FIELD

The present disclosure relates to a cooling fan having a cooling function and a seat cooling device including the cooling fan.

BACKGROUND ART

Currently, cooling seats for cooling seats in summer are mainly used for automobile seats. The cooling seat is provided with a seat cooling device including a cooling fan.

In order to prevent overheating of electronic products or to prevent overheating of lighting devices, cooling fans are mainly used. The cooling fan blows air to perform a cooling function by rotating blades of the cooling fan as a fan motor is driven. When the amount of air to be discharged to an air outlet increases sharply or when a load that blocks an air flow is generated, at high power of the cooling fan, the air flow pressure increases. As a result, noise is generated and an overload occurs in the motor.

As disclosed in Korean Utility Model Registration Publication No. 20-0332249 (published on Oct. 27, 2003), in order to solve such a noise problem, a conventional centrifugal blower is provided with an impeller connected to a rotating shaft in a casing equipped with an air inlet and an air outlet, a backward air flow prevention plate installed in an upper end between the impeller and the air inlet, and a backward air flow prevention ring installed in a connection space between the impeller and the air inlet, to thereby prevent the occurrence of a backward air flow to thus reduce the noise.

In such a conventional centrifugal blower, air radiated in the radial direction is smoothly discharged through the air outlet at low power of the blower, and air can be prevented from flowing in the reverse direction by the backward air flow prevention plate.

However, when the amount of air discharged increases or a resistance is generated in an air flow by a load at the air outlet, at high power of the blower, some of the air cannot be discharged to the air outlet and flows in the reverse direction and thus collides with the air discharged to the air outlet, thereby generating noise, lowering the blowing efficiency, and overloading the motor.

DISCLOSURE

Technical Problem

It is an object of the present disclosure to provide a cooling fan capable of minimizing noise and preventing overload of a motor by bypassing a backward air flow to the outside from among the air discharged to an air outlet due to resistance to a high power air blow or an air flow, and a seat cooling device including the cooling fan.

It is another object of the present disclosure to provide a cooling fan and a seat cooling device having the cooling fan, which can improve the blowing efficiency while minimizing noise by removing a bell mouth formed in an air inlet.

Technical Solution

A cooling fan according to an aspect of the present disclosure includes: a fan housing having an air inlet formed at a front surface thereof and through which air flows and an air outlet formed at a side surface of the fan housing and through which air is discharged; and an impeller mounted inside the fan housing to introduce air in an axial direction thereof and discharge air in a radial direction thereof, wherein a bypass passage is formed at an edge of the air inlet so that air flowing in a direction opposite to the air outlet can be discharged to the outside.

In the inside of the fan housing, an air suction passage for sucking air may be formed in the inside of the impeller, an air discharge passage through which air is discharged may be formed outside the impeller, and the bypass passage may be formed to communicate with the air discharge passage.

The bypass passage may extend outward from an edge of the air inlet so that the air discharge passage may be exposed to the outside.

The bypass passage may be connected to protective ribs formed radially to the air inlet to divide the bypass passage into a plurality of zones.

The bypass passage may be formed at a predetermined interval in the circumferential direction at an edge of the air inlet, and may be formed in a range of 90 degrees to 180 degrees at a position where the air outlet is formed.

The bypass passage may be formed at an interval over 360 degrees at an edge of the air inlet.

The bypass passage may be configured to include a first bypass passage portion which is formed at a position where the air outlet is formed, so as to expose the air discharge passage, and a second bypass passage portion which is formed at the other edge of the circumferential edge of the air inlet except for the first bypass passage portion, wherein the second bypass passage may have a smaller area than the first bypass passage portion.

The bypass passage may be formed in two to six bypass passage portions at an interval in the circumferential direction at an edge of the air inlet.

The bypass passage may be configured to include first bypass passages which are formed at a predetermined interval in the circumferential direction at an edge of the air inlet, and second bypass passages which are formed between the first bypass passages, wherein the second bypass passages may be formed to have an area smaller than the first bypass passages.

Advantageous Effects

As described above, the cooling fan according to an embodiment of the present disclosure forms a bypass passage at the edge of the air inlet of the fan housing to discharge the air flowing in the reverse direction to the outside, thereby preventing noise from being generated due to the flow resistance of the air, and improving blowing efficiency.

In addition, the bell mouth formed in the air inlet is removed, and a bypass passage communicating with the air discharge passage is formed at regular intervals in the circumferential direction of the air inlet, thereby improving the blowing efficiency while minimizing noise.

BEST MODE

Hereinafter, embodiments of the present invention will be described in detail with reference to the accompanying drawings. The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

Figure 1:
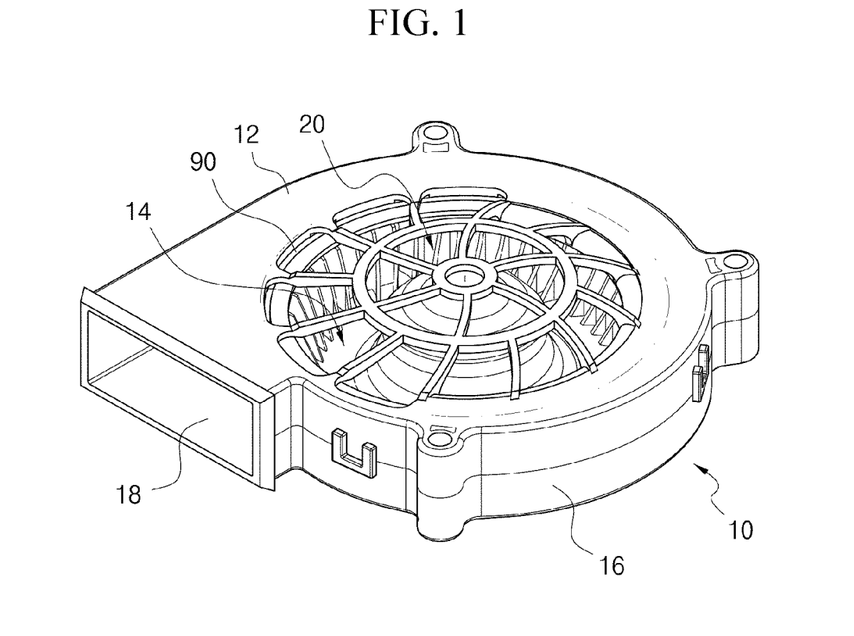
FIG. 1 is a perspective view of a cooling fan according to a first embodiment of the present disclosure.
Figure 2:
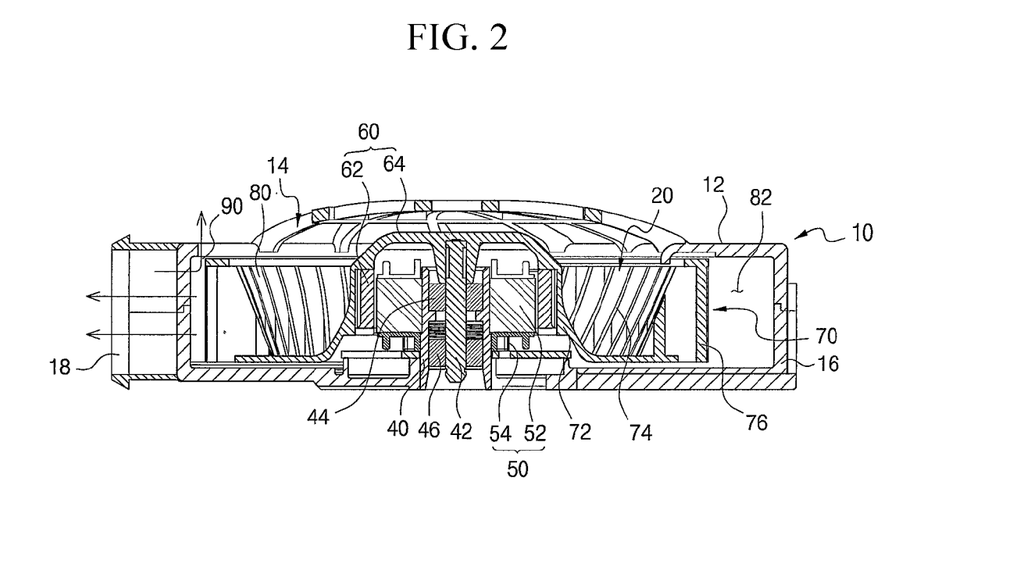
FIG. 2 is a cross-sectional view of the cooling fan according to the first embodiment of the present disclosure.

Referring to FIGS. 1 and 2, a cooling fan according to an embodiment of the present invention includes: a fan housing 10 provided with an air inlet 14, through which air is introduced, which is formed on a front surface 12 of the fan housing 10 and an air outlet 18, through which air is discharged, which is formed on a side surface 16 of the fan housing 10; and a fan unit 20 mounted inside the fan housing 10 to generate an air blowing force.

The fan unit 20 is a fan in which air flows in the axial direction and air is discharged in the radial direction, and includes: a rotary shaft 42 rotatably supported on a supporter 40 formed in the fan housing 10, a stator 50 fixed to the outer circumferential surface of the supporter 40 and to which power is supplied; a rotor 60 fixed to the rotary shaft 42 and rotating with the rotary shaft 42; and an impeller 70 which is formed integrally with the rotor 60 and the rotary shaft 42 in which air is sucked in the axial direction and air is radially discharged.

The stator 50 includes a stator core 52 fixed to the outer circumferential surface of the support 40 and a coil 75 wound around the stator core 52 and to which power is applied.

The rotor 60 includes: a magnet 62 that is annularly arranged on the outer circumferential surface of the stator 50 with a predetermined gap therebetween; and a rotor support body 64 to which the magnet 62 is fixed and with which the rotary shaft 42 and the impeller 70 are integrally formed.

A first bearing 44 and a second bearing 46 are mounted inside the support 72 to rotatably support the rotary shaft 42.

The impeller 70 includes: a hub 72 integrally formed with the rotor support 64; a blade 74 formed in a circumferential direction on the outer circumferential surface of the hub 72 to generate an air blowing force; and a ring portion 76 formed in a ring shape at an edge of the blade 74 and through which air is discharged.

When the impeller 70 is rotated, air is sucked in the axial direction, and air is radially discharged through the ring portion 76.

Protective ribs are formed radially in the air inlet 14 formed in the front surface 12 of the fan housing 10 to protect the impeller 70. The air outlet 18 through which air is radially discharged is formed in the side surface 16 of the fan housing 10.

When the impeller 70 is rotated, air flows in the axial direction of the impeller 70 through the air inlet 14 and air is discharged in the radial direction of the impeller 70 in the cooling fan. Accordingly, the inside of the fan housing 10 is divided into an air suction passage 80 which corresponds to the inner portion of the impeller and through which air is sucked, and an air discharge passage 82 which corresponds to the outer portion of the impeller and through which air is discharged.

This cooling fan sucks air in the axial direction thereof through the air inlet 14 and radially discharges the air through the air outlet 18. Here, since the flow of air is not much at the time of low power of the cooling fan, air flows smoothly and noise due to the flow resistance of air is not generated.

However, when high power of the cooling fan or a resistance to the air flow is generated, the amount of air flowing into the air inlet 14 is increased, but the amount of air discharged through the air outlet 18 is reduced, and thus some air flows into the fan housing 10 reversely due to the resistance to the air flow.

Here, the air discharged through the air outlet 18 and the air traveling in the direction opposite to the air discharge direction of the air outlet 18 collide with each other, generating noise and reducing the blowing efficiency. In particular, when an existing cooling fan is installed on a cooling seat of a vehicle, resistance is generated in the process of blowing air blown by the cooling fan to the fiber sheets of the cooling seat or passing through a filter, and thus a problem arises that noise increases due to the air flow resistance.

In the present embodiment, all the air is discharged through the air outlet 18 at the time of low power of the cooling fan, such that the blowing amount is not lowered. A bypass passage 90 is formed at the edge of the air inlet 14 of the fan housing 10 so as to minimize the noise generation while maintaining the blowing performance by discharging, to the outside, the air flowing in the direction opposite to the air discharge direction of the air outlet 18 when high power of the cooling fan or resistance to the air flow is generated.

The bypass passage 90 according to an embodiment of the present invention can maintain the air blowing performance by preventing the air discharged through the air outlet 18 from flowing into the bypass passage 90 at the low power of the cooling fan, and by discharging the air travelling in the direction opposite to the air discharge direction of the air outlet 18 through the bypass passage 90 to reduce noise.

The bypass passage 90 is formed in the front surface 12 of the fan housing 10 so as to communicate with the air discharge passage 82 of the fan housing 10 so that air advancing in the reverse direction to the air discharge direction of the air outlet 18 is bypassed in the axial direction.

The bypass passage 90 is formed at an edge of the air inlet 14 and is formed at an interval L on the outer surface of the impeller 70 so as to communicate with the air discharge passage 82 of the fan housing 10, so that the air discharge passage 82 is exposed to the outside. That is, the bypass passage 90 is formed in the outer side of the outer surface of the impeller 70 so that the air discharge passage 82 is exposed, and the air advancing in the reverse direction to the air discharge direction of the air outlet 18 is discharged to the outside through the bypass passage 90.

The bypass passage 90 may be connected to the protective ribs formed radially to the air inlet 14 and thus may be formed in a shape of dividing the bypass passage into a plurality of regions.

The cooling fan receives air in the axial direction through the air inlet 14 formed in the front surface 12 of the fan housing 10 and discharges the air in the radial direction through the air outlet 18 formed in the side surface 16 of the fan housing 10. Thus, a force radially discharged is applied to the air in a positive pressure region 82 of the fan housing 10 at the low power of the cooling fan, and thus air is not discharged via the bypass passage 90 formed in the axial direction of the fan housing 10. Even if air is discharged in this case, the amount of the air discharged via the bypass passage 90 is small enough not to affect the blowing amount.

An air flow resistance is generated in the air outlet 18 at the tile of the high power of the cooling fan or when a load is generated at an air discharge side so that a part of the air discharged through the air outlet 18 flows into the fan housing 10 in the reverse direction to the air discharge direction of the air outlet 18. Here, the air traveling in the reverse direction is discharged in the axial direction through the bypass passage 90 formed in the front surface 12 of the fan housing 10, to minimize the noise generated when colliding with the air moving in the forward direction of the air outlet 18, and prevent the air volume due to the flow resistance from being lowered.

Figure 3:
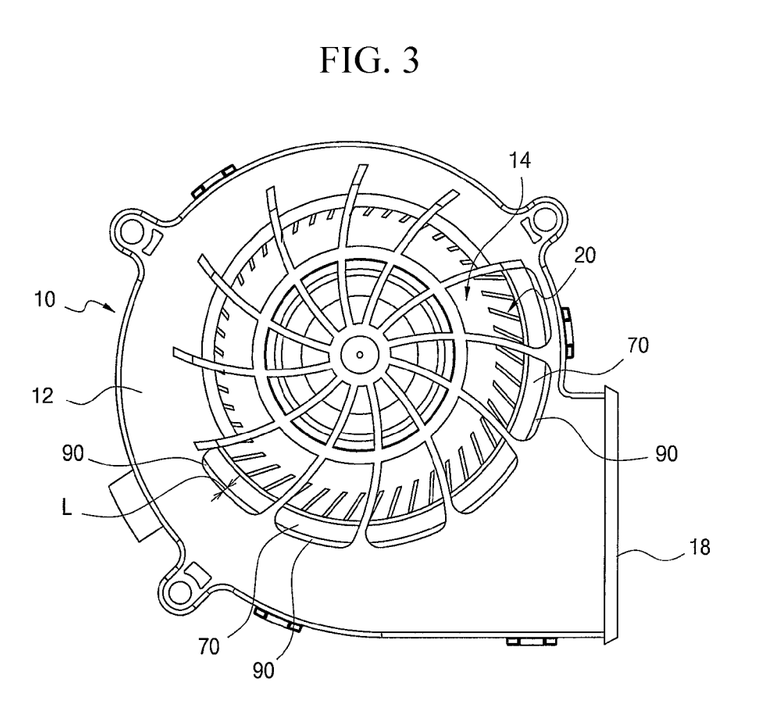
FIG. 3 is a plan view of a fan housing showing a bypass passage according to the first embodiment of the present disclosure.

As illustrated in FIG. 3, the bypass passage 90 according to the first embodiment is formed at a predetermined interval in the circumferential direction at the edge of the air inlet 14, and is formed in a range of 90 degrees to 180 degrees at a place close to the air outlet 18.

That is, the bypass passage 90 according to the first embodiment is formed so as to extend outward from the edge of the air inlet 14, so that the air discharge passage 82 of the fan housing 10 is exposed to the outside.

As such, the bypass passage 90 according to the first embodiment is formed only at a position close to the air outlet 18, so as to discharge air flowing in the reverse direction from the air outlet 18.

Figure 4:
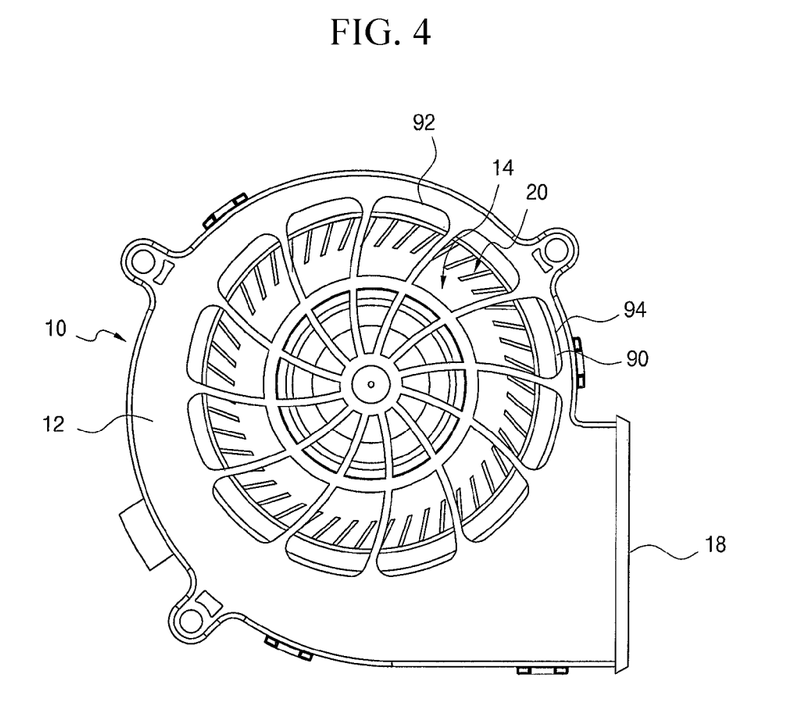
FIG. 4 is a plan view of a fan housing showing a bypass passage according to a second embodiment of the present disclosure.

As shown in FIG. 4, a bypass passage according to a second embodiment is formed at regular intervals near the air outlet 18, and includes a first bypass passage portion 94 formed to expose the air discharge passage 82 to the outside, and a second bypass passage portion 92 which is formed at the other edge of the circumferential edge of the air inlet 14 except for the first bypass passage portion 94, wherein the second bypass passage 92 has a smaller area than the first bypass passage portion 94 such that the air discharge passage 82 is not exposed.

Here, the first bypass passage portion 94 may be formed in a range of 90 degrees to 180 degrees at a place close to the air outlet 18.

The first bypass passage portion 94 has the same function as the bypass passage 90 described in the first embodiment, and The second bypass passage portion 92 has an area smaller than the first bypass passage portion 94 to thus expand the suction area of the air and secondarily discharge air not discharged through the first bypass passage 94 but passed through the air suction passage 80 of the fan housing 10.

Figure 5:
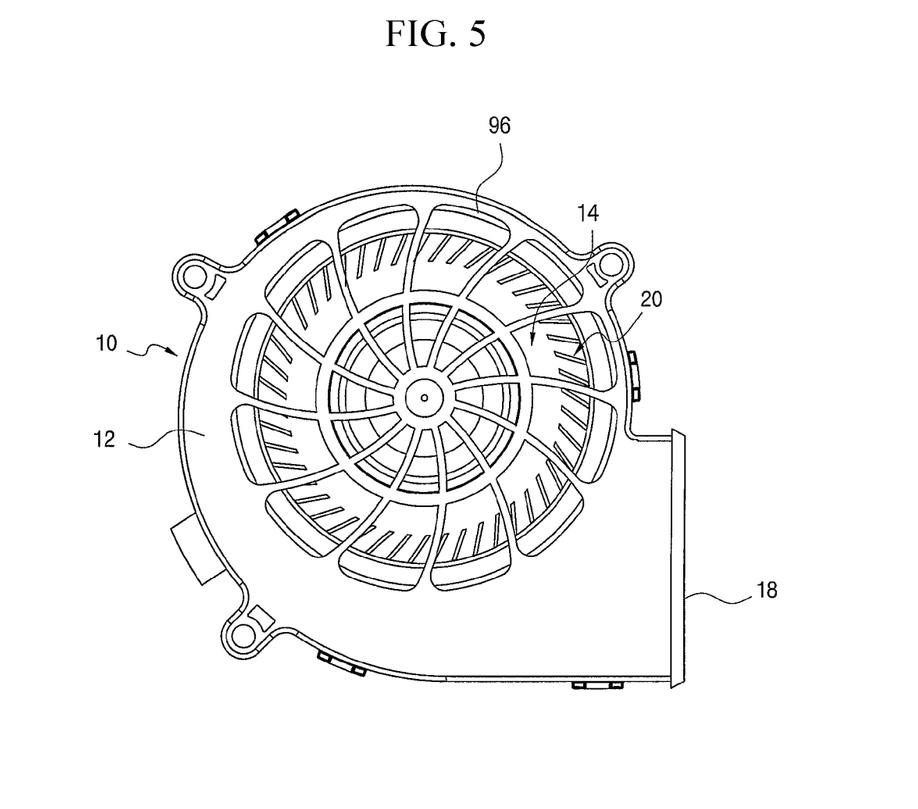
FIG. 5 is a plan view of a fan housing showing a bypass passage according to a third embodiment of the present disclosure.

As shown in FIG. 5, a bypass passage 96 according to a third embodiment is formed at regular intervals in the circumferential direction on the entire circumference of the air inlet 14 all over 360 degrees, thereby expanding the area of the bypass passage 90 described in the first embodiment and thus improving the bypass efficiency of the air flowing in the reverse direction.

Figure 6:
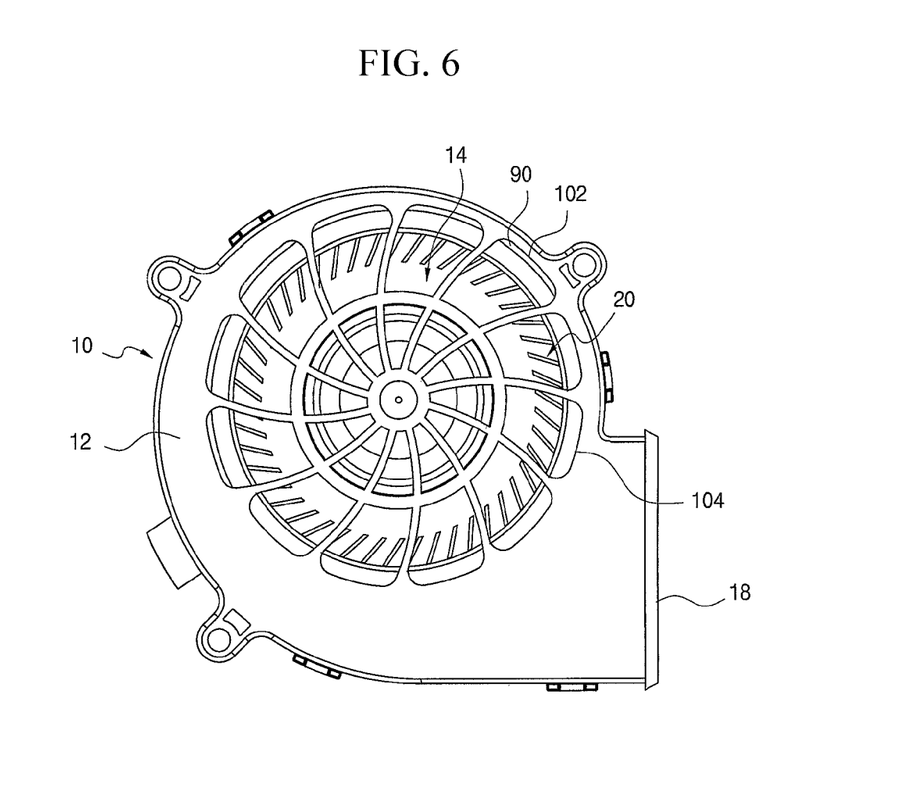
FIG. 6 is a plan view of a fan housing showing a bypass passage according to a fourth embodiment of the present disclosure.

As shown in FIG. 6, a bypass passage according to a fourth embodiment includes a first bypass passage portion 104 which is formed in a position close to the air outlet 18 and formed in a manner such that the air discharge passage 82 is not exposed to the outside, and a second bypass passage portion 102 which is formed at the other edge of the circumferential edge of the air inlet 14 except for the first bypass passage portion 104, wherein the second bypass passage 102 has a smaller area than the first bypass passage portion 104 such that the air discharge passage 82 is exposed.

Figure 7:
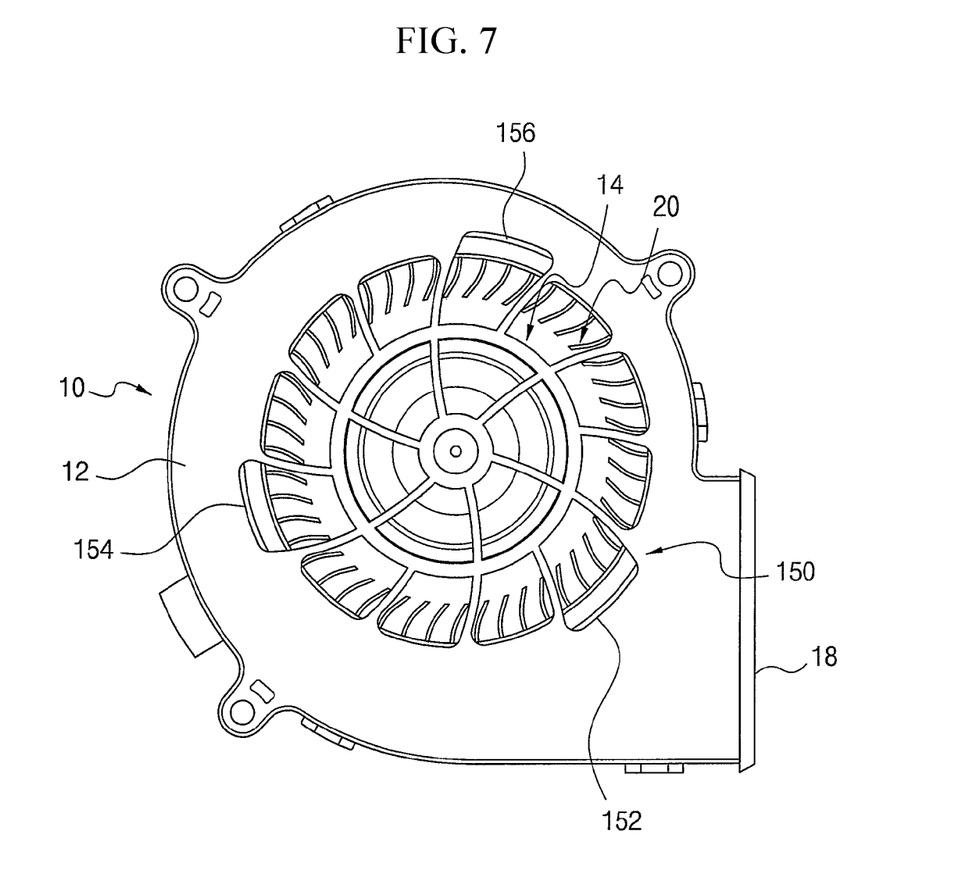
FIG. 7 is a plan view of a fan housing showing a bypass passage according to a fifth embodiment of the present disclosure.

As shown in FIG. 7, a bypass passage 150 according to a fifth embodiment is formed in two to six bypass passage portions equidistantly in the circumferential direction at the edge of the air inlet 14. The bypass passage 150 is formed in the same structure as the bypass passage 90 described in the first embodiment.

The edge of the air inlet 14 is formed in a flat shape rather than a curved shape like a bell mouth shape to prevent noise from being generated. That is, the bell mouth which is formed in a curved shape is removed to increase the positive pressure at the existing air inlet through which air is sucked, thereby minimizing the noise generated by the bell mouth.

When the bypass passage 150 is less than two bypass passage portions, the amount of air travelling in the reverse direction is small and thus it is difficult to reduce the noise. If the number of the bypass passage portions is six or more, leakage may occur in the discharged air and thus a problem may arise that the air blowing amount is reduced.

When the bypass passage 150 is formed in two bypass passage portions, the bypass passage portions are formed at intervals of 180 degrees in the circumferential direction of the air inlet. When the bypass passage 150 is formed in three bypass passage portions, the bypass passage portions are formed at intervals of 120 degrees in the circumferential direction of the air inlet. When the bypass passage 150 is formed in four bypass passage portions, the bypass passage portions are formed at intervals of 90 degrees in the circumferential direction of the air inlet. When the bypass passage 150 is formed in five bypass passage portions, the bypass passage portions are formed at intervals of 72 degrees in the circumferential direction of the air inlet. When the bypass passage 150 is formed in six bypass passage portions, the bypass passage portions are formed at intervals of 60 degrees in the circumferential direction of the air inlet. The bypass passage 150 is arranged at equal intervals in the circumferential direction so that the air advancing in the reverse direction can be sequentially discharged.

As shown in FIG. 7, the bypass passage 150 includes a first bypass passage portion 152, a second bypass passage portion 154, and a third bypass passage portion 156 formed at intervals of 120 degrees, and then it is possible to satisfy the condition that the blowing amount can be maintained while minimizing the noise.

Figure 8:
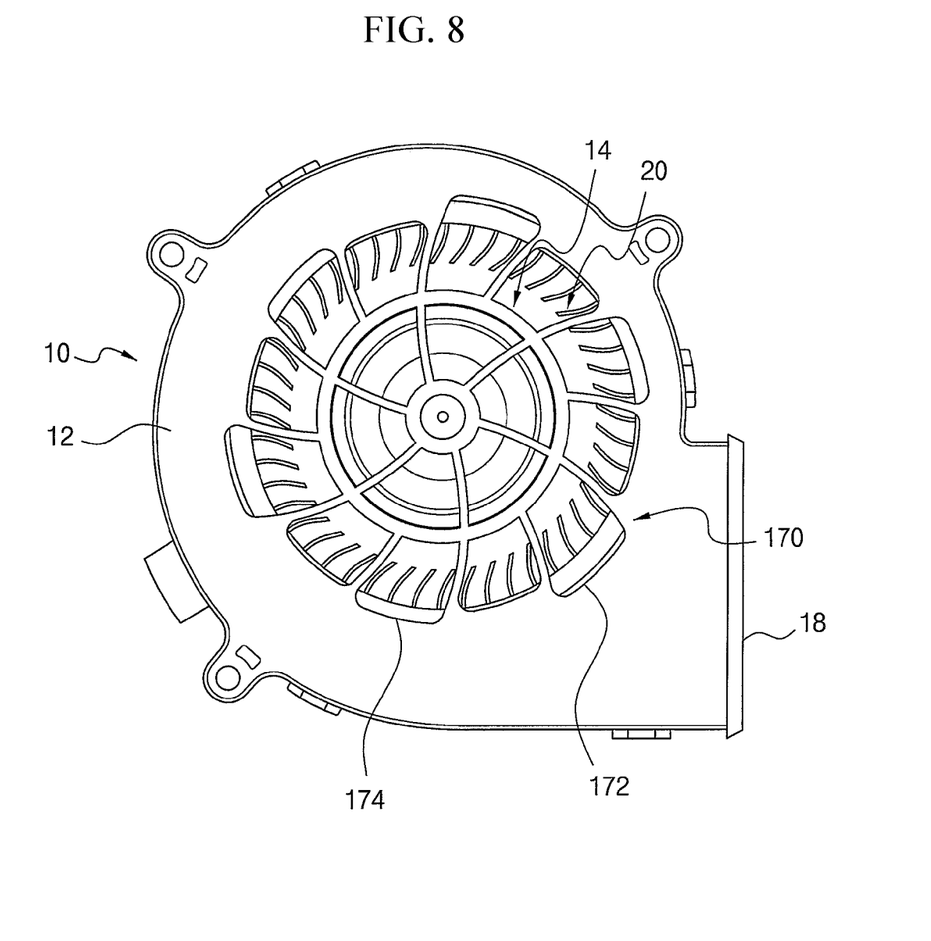
FIG. 8 is a plan view of a fan housing showing a bypass passage according to a sixth embodiment of the present disclosure.

As shown in FIG. 8, a bypass passage 170 according to a sixth embodiment includes first bypass passage portions 172 formed at an edge of the air inlet 14 at regular intervals in the circumferential direction, and second bypass passage portions 174 disposed between the first bypass passage portions 172 and formed in an area smaller than the first bypass passage portions 172.

The first bypass passage portions 172 are formed to have a larger area than the second bypass passage portions 174 so that the air discharge passage 82 is exposed to the outside, and The second bypass passage portions 174 are formed to have a smaller area than the first bypass passage portions 172 so that the air discharge passage 82 is not exposed.

The first bypass passage portions 172 are formed in the number of 2 to 6 equally spaced away from each other and the second bypass passage portions 174 are also formed in the number of 2 to 6 equally spaced away from each other. More preferably, when the first bypass passage portions 172 are formed in the number of three at equal intervals, and the second bypass passage portions 174 are formed in the number of three at equal intervals, it is possible to satisfy the optimal conditions for noise reduction and prevention of lowering of the air blowing amount.

Figure 9:
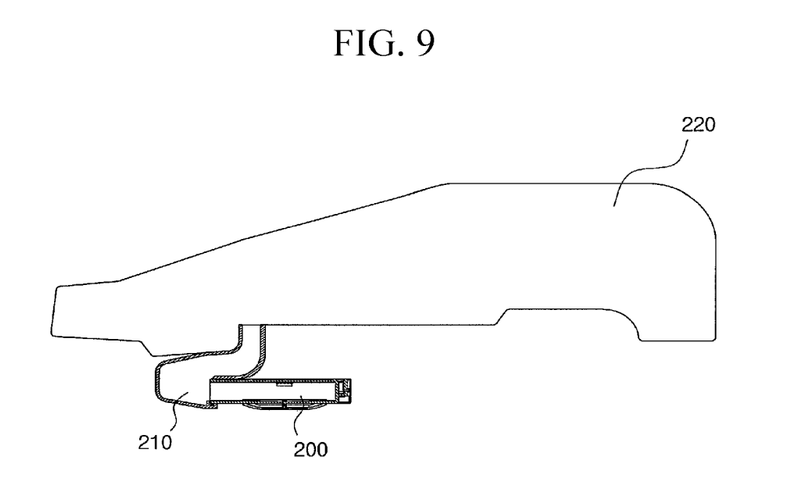
FIG. 9 is a side view of a seat cooling device according to an embodiment of the present disclosure.
Figure 10:
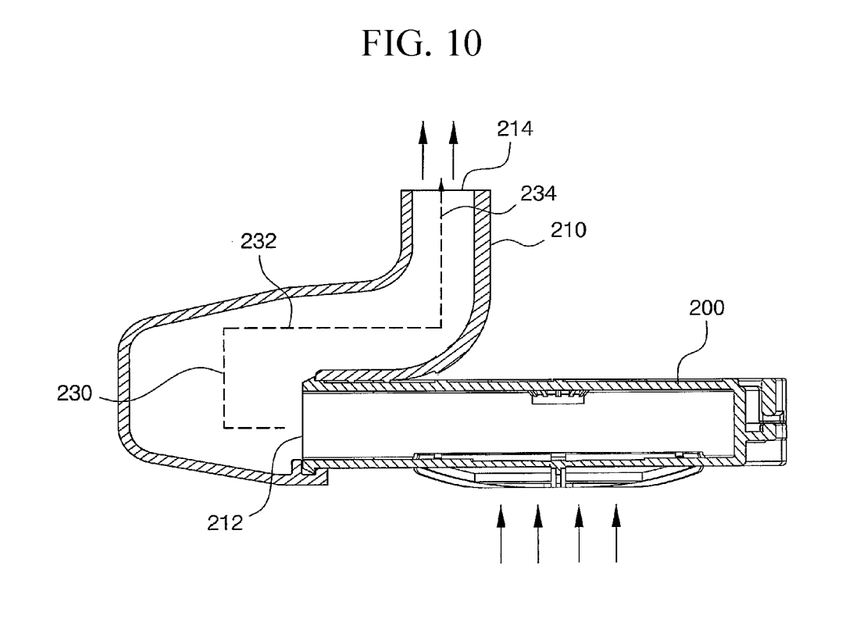
FIG. 10 is a cross-sectional view of a seat cooling device according to an embodiment of the present disclosure.

FIG. 9 is a side view of a cooling seat provided with a seat cooling device according to an embodiment of the present invention, and FIG. 10 is a cross-sectional view of a seat cooling device according to an embodiment of the present invention.

The seat cooling device includes a cooling fan 200 for blowing air required for cooling the seat and a duct 210 which is connected between the cooling fan 200 and the seat 220 to supply air generated from the cooling fan 200 to the seat 220. An air passage is formed in the interior of the seat so as to uniformly distribute the air supplied through the duct to the entire seat.

The cooling fan used in the seat cooling device is the same as the cooling fans described in the above embodiments.

The duct 210 includes: a first connection portion 212 arranged in a horizontal direction and connected to an air outlet 18 of a cooling fan; a second connection portion 214 arranged in a vertical direction and connected to the air passage of the seat 220; a first vertical guide portion 230 for guiding the air discharged from the cooling fan 200 in the vertical direction; a horizontal guide portion 232 for guiding the air guided by the first vertical guide portion 230 in the horizontal direction; and a second vertical guide portion 234 for guiding the air guided by the horizontal guide portion 232 in the vertical direction.

The duct 210 may be provided with a filter for filtering foreign substances contained in the air discharged from the cooling fan.

Since the air flowing path of the duct is complicated due to the nature of the seat cooling, in such a seat cooling device, and the air flowing passage for discharging the air in the cooling seat is small and complicated, a large amount of resistance is generated in the air discharged from the cooling fan. Accordingly, a part of the air discharged through the air outlet of the cooling fan flows into the cooling fan in the opposite direction to the air discharging direction of the air outlet, and collides with the air discharged from the cooling fan, thereby generating noise and overloading the cooling fan motor.

Therefore, when the cooling fan according to the embodiments of the present invention is applied to the seat cooling device, it is possible to prevent the air blowing amount from being reduced while minimizing the noise.

Figure 11:
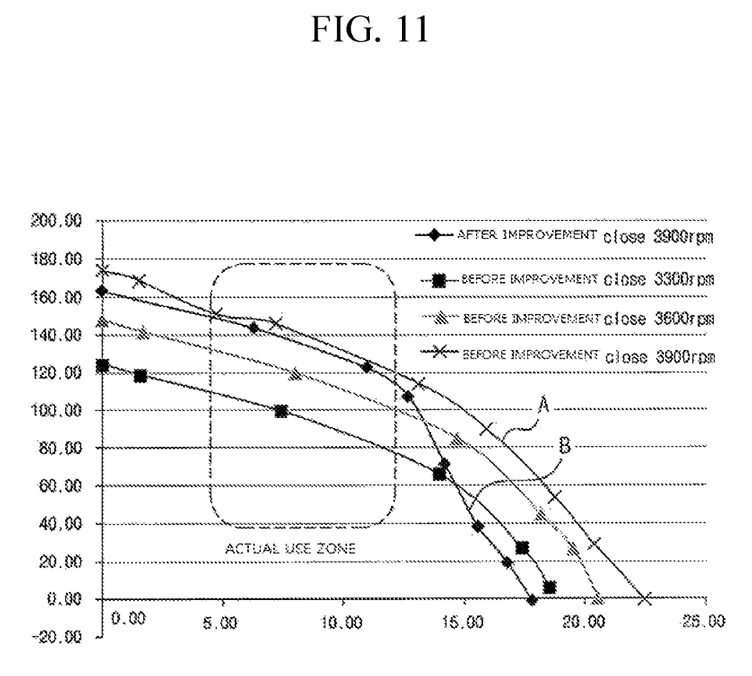
FIG. 11 is a graph comparing blowing amounts versus RPM between a cooling fan.

FIG. 11 is a graph comparing air blowing amounts versus RPM between a cooling fan according to an embodiment of the present invention and a conventional cooling fan. The air blowing amount relative to the RPM of the conventional cooling fan is indicated by line A, and the air blowing amount relative to the RPM of the cooling fan according to the embodiment of the present invention is indicated by line B.

As shown in the graph of FIG. 11, it can be seen that almost the same air blowing amount is generated at the same RPM in the actual use zone between the cooling fan according to the embodiment of the present invention and the conventional cooling fan. Therefore, the cooling fan according to the embodiment of the present invention can generate the same air volume as the conventional cooling fan and can minimize the noise generation in the actual use zone.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention is suitable for use as a cooling fan of an air-cooling type cooling device which is installed in a cooling seat, a high-performance electronic product, or a lighting device, thereby functioning to dissipate heat, minimizing noise generation and improving blowing efficiency.

What is claimed is:

1. A cooling fan comprising:
a fan housing having an air inlet formed on a front surface thereof and through which air flows and an air outlet formed on a side surface of the fan housing and through which air is discharged; and
an impeller mounted inside the fan housing to introduce air in an axial direction thereof and discharge air in a radial direction thereof,
wherein a bypass passage is formed at an edge of the air inlet so that air flowing in a direction opposite to the air outlet can be discharged to the outside, and
wherein the bypass passage is connected to protective ribs formed radially to the air inlet to divide the bypass passage into a plurality of zones.

2. The cooling fan of claim 1, wherein, in the inside of the fan housing, an air suction passage for sucking air is formed in the inside of the impeller, and an air discharge passage through which air is discharged is formed outside the impeller, wherein the bypass passage is formed to communicate with the air discharge passage.

3. The cooling fan of claim 2, wherein the bypass passage extends outward from an edge of the air inlet so that the air discharge passage is exposed to the outside.

4. The cooling fan of claim 1, wherein the bypass passage is formed at a predetermined interval in the circumferential direction at an edge of the air inlet, and is formed in a range of 90 degrees to 180 degrees at a position where the air outlet is formed.

5. The cooling fan of claim 1, wherein the bypass passage is formed at an interval over 360 degrees at an edge of the air inlet.

6. The cooling fan of claim 2, wherein
the bypass passage comprises:
a first bypass passage portion which is formed at a position close to the air outlet, such that the air discharge passage is exposed; and a second bypass passage portion which is formed at the other edge of the circumferential edge of the air inlet except for the first bypass passage portion, wherein the second bypass passage has a smaller area than the first bypass passage portion such that the air discharge passage is not exposed.

7. The cooling fan of claim 2, wherein
the bypass passage comprises: a first bypass passage portion which is formed at a position close to the air outlet, such that the air discharge passage is not exposed; and
a second bypass passage portion which is formed at the other edge of the circumferential edge of the air inlet except for the first bypass passage portion, wherein the second bypass passage has a larger area than the first bypass passage portion such that the air discharge passage is exposed.

8. The cooling fan of claim 2, wherein
the bypass passage is arranged at regular intervals in the circumferential direction thereof at an edge of the air inlet.

9. The cooling fan of claim 8, wherein
the bypass passage is formed in two to six bypass passage portions.

10. The cooling fan of claim 2, wherein
the bypass passage comprises:
first bypass passage portions formed at an edge of the air inlet at a predetermined interval in the circumferential direction thereof; and
second bypass passages arranged between the first bypass passage portions and formed to have a smaller area than the first bypass passage portions.

11. The cooling fan of claim 10, wherein
the number of the first bypass passage portions is two to six, and the number of the second bypass passage portions is the same as the number of the first bypass passage portions.

12. The cooling fan of claim 1, wherein
an edge of the air inlet is formed in a flat shape without a bell mouth.

13. A seat cooling device comprising:
a seat having an air passage through which air passes;
a blowing fan for generating air necessary for cooling the seat; and
a duct connecting between the blowing fan and the seat, wherein the blowing fan is one according to claim 1.

14. A cooling fan comprising:
a fan housing having an air inlet formed on a front surface thereof and through which air flows and an air outlet formed on a side surface of the fan housing and through which air is discharged; and
an impeller mounted inside the fan housing to introduce air in an axial direction thereof and discharge air in a radial direction thereof,
wherein a bypass passage is formed at an edge of the air inlet so that air flowing in a direction opposite to the air outlet can be discharged to the outside, and
wherein the bypass passage is formed at a predetermined interval in the circumferential direction at an edge of the air inlet, and is formed in a range of 90 degrees to 180 degrees at a position where the air outlet is formed.

15. The cooling fan of claim 14, wherein, in the inside of the fan housing, an air suction passage for sucking air is formed in the inside of the impeller, and an air discharge passage through which air is discharged is formed outside the impeller, wherein the bypass passage is formed to communicate with the air discharge passage.

16. The cooling fan of claim 15, wherein the bypass passage extends outward from the edge of the air inlet so that the air discharge passage is exposed to the outside.

17. A cooling fan comprising:
a fan housing having an air inlet formed on a front surface thereof and through which air flows and an air outlet formed on a side surface of the fan housing and through which air is discharged; and
an impeller mounted inside the fan housing to introduce air in an axial direction thereof and discharge air in a radial direction thereof,
wherein a bypass passage is formed at an edge of the air inlet so that air flowing in a direction opposite to the air outlet can be discharged to the outside, and
wherein the bypass passage is formed at an interval over 360 degrees at an edge of the air inlet.

18. The cooling fan of claim 17, wherein, in the inside of the fan housing, an air suction passage for sucking air is formed in the inside of the impeller, and an air discharge passage through which air is discharged is formed outside the impeller, wherein the bypass passage is formed to communicate with the air discharge passage.

19. The cooling fan of claim 18, wherein the bypass passage extends outward from the edge of the air inlet so that the air discharge passage is exposed to the outside.

* * * * *